(12) United States Patent
Durkin et al.

(10) Patent No.: US 6,586,047 B2
(45) Date of Patent: Jul. 1, 2003

(54) PROCESS FOR PLATING PARTICULATE MATTER

(76) Inventors: Brad Durkin, 820 Saint Anne La., Monroe, MI (US) 48162; Boules H. Morcos, 40007 Sandpoint Way, Novi, MI (US) 48375; Duncan Beckett, Woodcroft, 61 Salters Lane, Tamworth, Staffordshire (GB), B798 BH ( * ) Notice: Subject to any disclaimer, the term of this patent is extended or adjusted under 35 U.S.C. 154(b) by 0 days.

(21) Appl. No.: 09/946,404

(22) Filed: Sep. 5, 2001

(65) Prior Publication Data

US 2003/0044527 A1 Mar. 6, 2003

(51) Int. Cl.⁷ .............................. B05D 7/00; B05D 1/18
(52) U.S. Cl. ...................... 427/217; 427/212; 427/215; 427/443.1
(58) Field of Search .................. 427/443.1, 215, 427/217, 212

(56) References Cited

U.S. PATENT DOCUMENTS

| | | | |
|---|---|---|---|
| 3,011,920 A | | 12/1961 | Shipley, Jr. |
| 3,532,518 A | | 10/1970 | D'Ottavio |
| 3,859,128 A | * | 1/1975 | Burks et al. ................. 148/277 |
| 3,902,908 A | | 9/1975 | Rantell et al. |
| 4,403,001 A | * | 9/1983 | Grenier ...................... 427/217 |
| 4,435,189 A | | 3/1984 | Bovenkerk |
| 4,600,609 A | | 7/1986 | Leever et al. |
| 4,863,758 A | | 9/1989 | Rhodenizer |
| 4,944,985 A | * | 7/1990 | Alexander et al. .......... 428/570 |
| 5,178,909 A | * | 1/1993 | Hayashi ...................... 427/125 |
| 5,453,293 A | * | 9/1995 | Beane et al. ................. 427/96 |

* cited by examiner

*Primary Examiner*—Michael Barr
(74) *Attorney, Agent, or Firm*—Carmody & Torrance LLP

(57) ABSTRACT

A process for electrolessly plating particulate matter is disclosed wherein the particulate and the electroless plating solution, without a reducing agent component, are combined with agitation in a plating vessel. If necessary, activator species are added directly to the plating solution. The reducing agent component is then added to the plating solution to initiate plating. Reliable plating upon the particulate, without instability of the plating solution, is achieved.

9 Claims, No Drawings

PROCESS FOR PLATING PARTICULATE MATTER

BACKGROUND

This invention relates to a process for plating a metal coating onto the surfaces of particulate matter. Particulate matter is especially difficult to plate because of its small size and large surface area. Because it is difficult to provide reliable electrical contact to small particles, it is not generally practical to electroplate the particles. On the other hand, particulate matter can be plated using electroless techniques which do not require electrical contact but instead plate through chemical reduction. However, the relatively large surface area presented by particulate matter tends to cause instability in electroless plating solutions and therefore unreliable plating.

In general, the electroless deposition of metals such as nickel, copper or other metals onto both metallic and non-metallic surfaces has been known and practiced for some time. The most commonly practiced method of electroless deposition involves chemical reduction where the deposition takes place by the action of a reducing agent on metal salts dissolved in the plating solution in the presence of a substrate composed of an inherently catalytic material or a material catalyzed by some form of pre-treatment. Most substrates to be plated are not composed of inherently catalytic material and must therefore undergo a pre-treatment in order to render the surfaces catalytic to the action of the subsequent plating solution. The most common means for effectuating this activation is by contact of the surfaces to be plated with an activator solution comprising ionic or colloidal species which are catalytic to electroless plating, prior to contact with the electroless plating solution. Upon contact, the ionic or colloidal species adsorb onto the surfaces to be plated thereby rendering those surfaces catalytic to the subsequent plating solution.

Activator solutions generally comprise ionic or colloidal palladium, platinum, gold, silver, ruthenium or other similar noble metals as the activating ingredient. Other metals such as tin may also be present to stabilize the colloid and/or to increase adsorption. In this regard please refer to U.S. Pat. Nos. 3,011,920; 3,532,518; 3,902,908; and 4,863,758; the teachings each of which are incorporated herein by reference in their entirety. The foregoing patents describe a variety of compositions and processes useful in activating non-catalytic surfaces prior to electroless plating. In each case the process involves a pre-treatment of the surface with an activator solution prior to contact with the electroless plating solution.

A wide variety of electroless plating solutions are known, of which electroless copper and electroless nickel are the most prevalent. These plating solutions generally comprise a source of nickel or copper ions, a reducing agent, a pH controlling compound and complexing agents as well as stabilizers. The most common electroless nickel plating solutions use hypophosphites as reducing agents, while electroless copper typically employs formaldehyde. Complexing agents include ammonia, EDTA and similar amines, and organic acids such as citric acid, maleic acid, melonic acid and lactic acid. Electroless copper compositions generally employ alkai metal hydroxides and operate with highly alkaline pH while electroless nickel compositions generally regulate pH with ammonia and operate with pH in the range of 4–7. For a discussion of electroless nickel plating, please refer to U.S. Pat. No. 4,600,609, the teachings of which are incorporated by reference herein in their entirety.

Electroless plating solutions are invariably unstable solutions, to which stabilizing compounds are added to control this instability. A variety of stabilizing compounds are known for this purpose. However, even with stabilizing compounds employed, electroless plating solutions can be unstable and this instability increases with increasing platable surface area in the solution at any one time (i.e. square meters of surface area per liter of plating solution). This can be especially troublesome when plating particulate matter, since even a small amount of particulate matter presents a large surface area to be plated. As a result, it has historically been difficult to plate particulate matter and the resulting instability in the plating solution can make the plating unusable.

Thus, it is an object of this invention to propose a process which is capable of plating large quantities of particulate matter in a reliable manner. These and other objects are accomplished by using a plating process as provided for below.

SUMMARY OF THE INVENTION

The inventors herein propose the following process for plating upon particulate matter:

1. load particulate matter into a plating vessel;
2. add all of the components of the electroless plating solution, preferably except the reducing agent, to the plating vessel with agitation;
3. if the particulate matter is not catalytic to the electroless plating bath, add activator solution to the plating vessel;
4. gradually add the reducing agent to induce and continue plating, preferably until substantially all of the metal ions in the plating solution are consumed through the plating reaction;
5. remove now the spent plating solution and repeat the process if necessary to build additional plated thickness or to add layers of different plated metals.

Preferably the steps of the process are carried out in the order given above, except that steps 1 and 2 may be interchanged, and agitation is employed throughout the process.

DETAILED DESCRIPTION OF THE INVENTION

The inventors herein have discovered a process for reliably plating particulate matter which overcomes electroless plating solution stability problems which have occurred in the past. The proposed process also allows for activation of the particulate matter within the plating solution itself, thereby reducing the number of necessary steps. Thus the inventors propose a process for plating upon particulate matter, said process comprising:

1. loading particulate matter in a plating vessel;
2. adding all of the components of an electroless plating solution, except for a reducing agent component, to the plating vessel with agitation;
3. if the particulate matter is not catalytic to the plating solution, then add activator solution to the plating vessel;
4. gradually add the reducing agent component to the plating vessel;
5. remove spent plating solution from the plating vessel once deposition is completed; and
6. optionally, repeat the process.

The proposed process can be used for plating upon a variety of particulate matter surfaces including diamond, ferrosilicate oxide particles, metal oxide particles, metal particles, plastic particles, and other similar particulate matter. Preferably the range of particles sizes in the material to be plated is not greater than about 200 percent from the smallest particle in the distribution to the largest particle in the distribution. In addition, it is also preferable that the average particle size is greater than about 10 microns and less than about 400 microns. Controlling particle size and particle size range can be easily accomplished by sieving the particulate matter prior to loading in the plating vessel. After sieving and prior to loading the particulate matter into the plating vessel, the particulate matter is preferably alkaline cleaned, fused and/or repeatedly rinsed in water to remove any dust or contaminates. Fused refers to treatment in a molten salt, such as sodium hydroxide and sodium nitrate.

The plating vessel is a tank which is effective to contain the particulate matter and the plating solution. The plating vessel is preferably a cylindrical tank with a conical-shaped bottom, which allows for easy removal of the plated matter through a valve at the bottom of the cone. Suitable materials of construction for the plating vessel include polyethylene, polypropylene or 316 stainless steel. The plating vessel must be equipped with agitation means sufficient to keep the particulate matter suspended and moving in the plating solution at all times during activation and plating. Agitation will impact the uniformity of the plate achieved, as well as the overall stability and reliability of the plating solution. The inventors have found that a propeller-type mixer, capable of operating at constant speed regardless of bath volume, is an effective agitation means, especially if combined with air bubbled through the plating solutions. Thus agitation provides for a uniform distribution of the particulate matter throughout the plating solution thereby enhancing plating uniformity and plating solution stability. Baffles may be installed in the plating vessel to improve agitation and the uniformity of agitation throughout the vessel.

The process is not limited by the type of electroless plating solution used, but generally electroless nickel and electroless copper plating solutions are used and preferred. Suitable electroless copper solutions include those comprising, (i) a source of copper ions such as copper chloride and/or copper sulfate, (ii) chelating agents, (iii) sodium or potassium hydroxide and (iv) formaldehyde as the reducing agent. Suitable electroless nickel plating solutions include those comprising (i) a source of nickel ions such as nickel sulfate and/or nickel chloride, (ii) chelating agents such as organic acids, (iii) pH controlling agents such as ammonia and (iv) hypophosphites as the reducing agent. Commercial electroless copper and electroless nickel plating solutions will also comprise other performance additives and stabilizers. As noted, when the particulate matter and the plating solution are initially combined (ie. steps 1 and 2), the plating solution preferably does not comprise its reducing agent. The absence of the reducing agent at this point prevents the electroless plating from occurring at this point and allows for subsequent activation of the particulate matter in situ in the plating solution. The inventors have also found that the gradual addition of the reducing agent as a separate component and process step greatly enhances the uniformity and reliability of the plate achieved as well as the stability of the plating solution. The particulate matter and the plating solution (without reducing agent) should be combined at this point with agitation sufficient to disperse the particulate matter evenly throughout the plating solution. Generally, from 2 to 4 gallons of plating solution are necessary for every kilogram of particulate matter to be plated.

Many of the particles to be plated including, diamond, ferrosilicate oxide, metal oxides and certain types of metals, are not naturally catalytic to electroless copper or electroless nickel plating solutions. They must therefore be rendered catalytic by contact with activator species. Until now, this activation has occurred in a separate step prior to contacting the material to be plated with the plating solution. However, the inventors here have discovered that by initially separating the reducing agent from the plating solution, the activator species can be added directly to the plating solution (without reducing agent) thereby activating the particulate matter in situ within the plating solution. As noted, the reducing agent is added subsequently thereby initiating the plating.

Activator solutions useful in this invention generally comprise ionic or colloidal noble species metal such as palladium, platinum, gold, silver or reuthenium as the activating ingredient. Other metals such as tin may also be present to stabilize the colloid and/or to increase adsorption. The most common commercially available activator solutions are either ionic palladium solutions or colloidal tin-palladium solutions. Either of the foregoing may be used in the process of this invention. If a palladium based activator is used, one should employ from about 25 to 100 milligrams of activator (as palladium) per kilogram of particulate matter. The activator solution is added to the plating solution (without reducing agent) containing the particulate matter with agitation.

After activation, the reducing agent is gradually added to the plating solution, with agitation. The addition of the reducing agent begins the plating reaction. The amount of reducing agent necessary to completely plate substantially all of the ionic metal species from the plating solution can be theoretically calculated based on the plating reaction, with provision for an additional 5–10%. This quantity of reducing agent is then gradually added over a period of from about 15 minutes to 1 hour. Preferably, during this period, substantially all of the metal species to be plated from the plating solution are plated. The most common reducing agent for electroless copper plating solutions is formaldehyde and the most common reducing agent for electroless nickel plating solutions is a hypophosphite such as sodium hypophosphite.

Once the plating is complete, the depleted plating solution is removed from the plating vessel. Fresh water is added with agitation to rinse the now plated particulate. The rinsing may be repeated if necessary.

In cases where it is necessary to build up multiple layers of plated metal upon the particulate matter or to achieve a specific weight gain, the process may be repeated. For instance, the particulate matter may initially be plated with electroless nickel. The process may then be repeated with electroless copper in order to form a plated copper layer over the nickel layer. In this case, since nickel is catalytic to electroless copper, no secondary activator is required.

Particulate matter, such as ferrosilicate oxide powders, when encapsulated with a plated metallic layer, is an effective media for electromagnetic shielding. For many shielding applications, the ferrosilicate oxide powder is preferably plated with a duplex layer of nickel followed by copper. However, for some specific applications, it is possible to achieve the necessary degree of attenuation of the electromagnetic waves with a single plated layer or weight gain of copper.

After plating, the plated particulate can be treated with an antitarnish such as benzotriazole. Final rinsing with a solvent or alcohol solution can improve drying.

The foregoing invention is further described with the following example which should be taken as illustrative only and not limiting in any manner.

EXAMPLE

Ferrosilicate oxide particles having a particle size ranging from sub-micron to about 400 microns in size were sieved through stainless steel sieves in order to separate a portion of the particulate having sizes ranging from about 150 microns to about 400 microns. After sieving the separated material (ie. 150–400 microns) it was rinsed until the rinse water was clear. The rinsed particulate matter is then plated using the following procedure:

1. 1 kg of the particulate matter is combined with 0.5 Liters each of MacDermid Niklad NiCAP-A & B electroless nickel plating solution concentrates (without the reducing agent component) (available from MacDermid, Incorporated of Waterbury, Conn.) in a cylindrical polyethylene plating vessel with a conical bottom and agitation means. 9 Liters of DI water is added and heated to 160 F. Agitation is provided by an air driven impeller. The particulate matter is uniformly dispersed throughout the plating solution.
2. 25 mL of MacDermid Niklad 262 palladium activator solution containing approximately 1.0 gram of palladium (available from MacDermid, Incorporated of Waterbury, Conn.) is added to the plating vessel with agitation.
3. 300 mL of MacDermid Niklad NiCAP-C (ie. the reducing agent component, for the plating solution, comprising sodium hypophoshite) is added to the plating solution, gradually, over a period of about ½ hour. Agitation is continued. This addition causes the plating reaction to begin and plating continue for about ½ hour until substantially all of the nickel is depleted from the plating solution.
4. Agitation is turned off, particulate settled, and plating solution removed.
5. Water is added and removed to rinse the plated particulate with agitation.
6. 1 gallon of MacDermid Niklad CuCAP-A electroless copper plating solution, without the reducing agent component, is added with agitation.
7. 100 mL of MacDermid Niklad CuCAP-B (ie. the reducing agent component, for the plating solution, comprising formaldehyde) is added to the electroless copper plating solution, gradually over a period of about ½ hour. Agitation is continued. This addition causes the plating reaction to begin and plating continues for about ½ hour until substantially all of the copper was depleted from the plating solution.
8. Agitation is turned off, particulate settled, and the plating solution is removed.
9. Water is added to rinse the plated particulate with agitation and then removed.
10. The plated particulate material is washed with an anti tarnish material, MacDermid Metex 667 at a concentration of 0.5 to 1.0% by volume for 1–2 minutes.
11. The plated particulate is removed from the vessel and dried in an oven at 150 F. Before drying in the oven, a separate wash with Isopropyl alcohol helps to speed up the drying process.

Upon examination the particulate ferrosilicate oxide was effectively plated with nickel and copper.

We claim:

1. A process for plating particulate matter, said process comprising:

a). combining particulate matter and an electroless plating solution, without a reducing agent component, in a plating vessel with agitation;

b). adding an activator for electroless plating to the plating solution; and then c). adding a reducing agent component to the plating solution; wherein the foregoing steps are carried out in the order given with respect to each other and wherein the electroless plating solution is selected from the group consisting of electroless nickel plating solutions, electroless copper plating solutions and combination thereof.

2. A process according to claim 1 wherein the plating solution is selected from the group consisting of electroless copper plating solutions and electroless nickel plating solutions and wherein the reducing agent component is selected from the group consisting of formaldehyde and hypophosphites.

3. A process according to claim 1 wherein the activator comprises ionic or colloidal palladium.

4. A process according to claim 1 wherein the average size of the particulate matter ranges from about 10 microns to about 400 microns.

5. A process according to claim 1 wherein the particulate matter is selected from the group consisting of metal oxides, ferrosilicate oxides and diamond.

6. A process according to claim 2 wherein the activator comprises ionic or colloidal palladium.

7. A process according to claim 2 wherein the average size of the particulate matter ranges from about 10 microns to about 400 microns.

8. A process according to claim 2 wherein the particulate matter is selected from the group consisting of metal oxides, ferrosilicate oxides and diamond.

9. A process according to claim 4 wherein the particulate matter is selected from the group consisting of metal oxides, ferrosilicate oxides and diamond.

* * * * *